Figure 1:
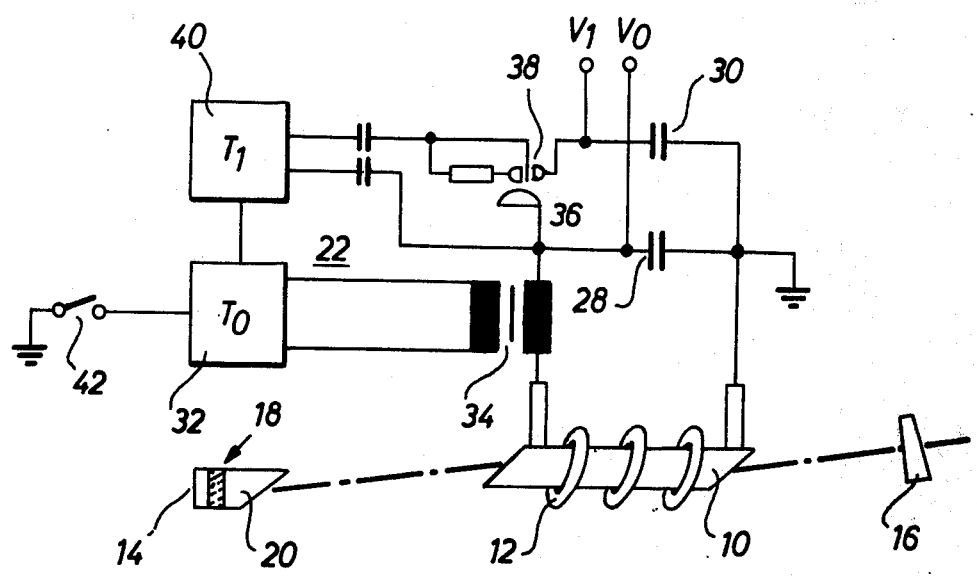

United States Patent [19]

Müller et al.

[11] 4,004,248
[45] Jan. 18, 1977

[54] CONTROL OF TIMING OF LASER OPERATION

[75] Inventors: Alexander Müller; Gerald R. Willenbring, both of Gottingen, Germany

[73] Assignee: Max-Planck-Gesellschaft zur Forderung der Wissenschaften e.V., Gottingen, Germany

[22] Filed: Mar. 5, 1975

[21] Appl. No.: 555,452

[30] Foreign Application Priority Data

Apr. 19, 1974 Germany .......................... 2418981

[52] U.S. Cl. ...................... 331/94.5 P; 331/94.5 T
[51] Int. Cl.² ........................................ H01S 3/092
[58] Field of Search .................... 331/94.5; 330/4.3

[56] References Cited

UNITED STATES PATENTS

| | | | |
|---|---|---|---|
| 3,172,056 | 3/1965 | Stitch | 331/94.5 P |
| 3,588,740 | 6/1971 | Bell | 331/94.5 PE |
| 3,842,366 | 10/1974 | Gordon et al. | 331/94.5 PE |
| 3,914,648 | 10/1975 | Friedman et al. | 331/94.5 P |

*Primary Examiner*—William L. Sikes
*Attorney, Agent, or Firm*—Flynn & Frishauf

[57] ABSTRACT

To prevent time jitter of laser action after occurrence of an event — such as energization of the laser — after a reference time, in which the laser is stimulated to emission after having received a pump pulse energy slightly less than the laser threshold energy, an additional, auxiliary pulse is superimposed on the main pumping pulse at a predetermined time after the reference time, and of sufficient energy to raise the laser above threshold, to thereby stimulate the laser to emission precisely with respect to the auxiliary pulse, and hence with respect to the reference time. The auxiliary pulse can be applied, for example, by an auxiliary pulse source, and having an energy level small with respect to the main pulse, but with an extremely short rise time.

13 Claims, 2 Drawing Figures

CONTROL OF TIMING OF LASER OPERATION

The present invention relates to lasers, and more particularly to control of lasers so that the laser will be stimulated to emission at an instant in time which can be precisely controlled and, especially, which can be controlled with respect to a reference time.

The onset of emission of a solid-state laser occurs with a considerable time jitter, that is, the exact instant of emission may vary between considerably wide limits after the pulse to stimulate the laser has begun. Lasers which are passively Q-switched and mode-locked have a particularly simple construction and operation and are further capable to radiate short pulses, down to the range of picoseconds. As the pulse power decreases, control of the timing of initiation of the emission by the laser becomes increasingly difficult. A well-defined temporal relationship between a reference time and the occurrence of a laser pulse is, however, needed for many applications, particularly when using a radiation pulse of a passive Q-switched mode-locked solid-state laser. Such apparatus is used, for example, in flash-spectroscopy using lasers [see, for example, J. Chem. Phys. 47, 3075 (1967)]. It has previously been proposed to synchronize a passive, phase-coupled neodymium gas laser with respect to predetermined events by utilizing a controlled, active control switch, operating on the basis of a discharge from a capacitor through cesium vapor.

It has also been proposed to obtain high peak values from lasers which are optically pumped by flash discharge tubes, without danger of overloading of the flash tubes by short discharges of high energy, by pumping the laser by means of double pulses [see Appl. Phys. Lett. 2, 204 (1963)]. Pumping a laser with double pumping pulses, that is, this double-pulse technique — by means of a flash tube — only permits increase of the output of a laser without overloading the flash tube itself, and to so control the energy of the various flash pulses that danger to the flash tubes themselves is avoided.

Synchronization of auxiliary electronic equipment with output pulses of a passively Q-switched and mode-locked solid-state laser is in some cases severely hampered by the fact that the onset of these pulses occurs with a sizeable jitter with respect to some reference time derived from the time course of the laser pump. A typical example might be the synchronization of an electronic flash of microsecond duration used as a probing light in laser flashspectroscopy as one attempts to extend this method into the picosecond region. For the most part the jitter appears to be due to the statistical nature of passive Q-switching, although other factors such as slight variations of cavity adjustment also seem to contribute. Reduction of the jitter probably would result by shortening the duration of the pumping light pulse by using a smaller capacitance on the pumping flash lamp charged to correspondingly higher voltage in order to conserve the energy of the discharge, but this condition is undesirable with regard to flashlamp life.

It is an object of the present invention to provide a technique, that is, a method and an apparatus to reduce time jitter, that is, insufficiently precise synchronization of initiation of radiation from the laser with respect to a reference time instant, which is simple, does not overload the pumping apparatus for the laser, such as a flash tube, and which further permits precise control of the timing of the laser pulse within shorter time periods than heretofore possible.

It is an additional object to provide increased peak power output from such a laser without producing significant deterioration in a pumping flash tube due to electrode sputtering and shock effects, which may occur rapidly in single, high-power discharges of short duration.

SUBJECT MATTER OF THE PRESENT INVENTION

Briefly, the laser is pumped slightly below threshold with a discharge through a pumping flash lamp, for example of about 1 msec. duration. At an optimum time during this pulse, preferably when the pumping pulse is about to reach the threshold energy level of the laser, the laser is quickly raised above threshold by injection of a second, auxiliary pulse which is short with respect to the main pulse, for example of about 10 microseconds duration, and having an energy which is small with respect to that of the main pulse, for example 20% at the most, and preferably less than 10%, e.g. as little as 5%.

The method and the apparatus in accordance with the present invention are simple, reliable, and can readily be constructed without requiring complicated or expensive equipment. Laser pulses in the picosecond range can be obtained, with synchronization possible with a minimum of time jitter.

Figure 2:
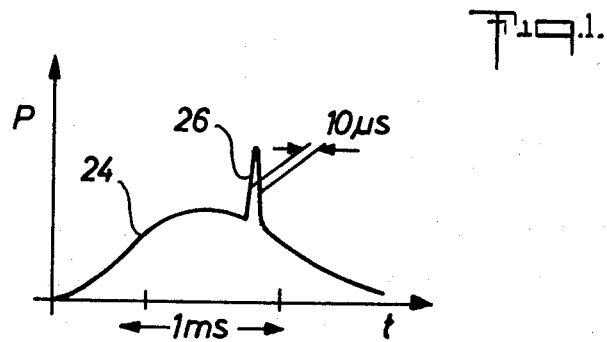

The invention will be described by way of example with reference to the accompanying drawings, wherein:

FIG. 1 is a schematic, partly perspective diagram of the apparatus to carry out the subject matter of the present invention, and FIG. 2 is a pulse power vs. time diagram of the pulses generated by the apparatus of FIG. 1, and applied to the laser; in this diagram, the time-integral of power, of course, defines the energy of the pulse.

By way of example, a ruby rod-type laser which is optically pumped is shown, having a ruby rod 10 as the medium to be stimulated, the end surfaces of which are cut at the Brewster-angle with respect to the axis of the ruby rod. The ruby rod may, for example, have a diameter of about 6.3 mm, and an axial length of about 10 cm. It is surrounded by a helical Xenon flash tube (for example Wingent-type 029), and located, together with the tube, in a reflector (not shown) of polished aluminum sheet metal.

The optical resonator of the laser is formed by two mirrors 14, 16, shown schematically only. Mirror 14 is combined with a schematically shown flow cell 18, through which, in operation, a solution of 3,3'-Diethylthiodicarbocyaniniodide is continuously circulated [see: Z. Naturf. 19a 1019 (1964)]. The flowcell operates, as known, as a phase coupler and as a Q-switch. Mirror 14, which is as highly reflective as possible, is a flat mirror and forms the back wall of flow cell 18. The front wall of the chamber formed by the flow cell which is approximately 1 mm thick is formed by a window 20 made of glass or quartz, which has a flat backside in the direction washed by the solution, and a frontside cut at the Brewster-angle. The liquid circulation loop is not shown for simplicity, and is known.

The other mirror 16 which has a reflectivity of about 55% is the output coupler for the laser radiation; it includes a slightly tapered or wedge angle (for example about 3°), and is made of glass or quartz.

The ruby rod is preferably cooled by means of a cooling arrangement, not shown, for example with water of about 17° C.

The Xenon flash tube 12 is connected to an electrical supply source generally shown at 22. The electrical supply source provides a longer main pulse 24 (see FIG. 2) having a substantial energy level, and a superimposed short auxiliary pulse 26, having an energy level which is small with respect to that of the main pulse. Both these pulses are generated by the electronic power supply 22.

In the example shown, power supply 22 has a main discharge capacitor 28, which operates as the energy supply source for the main pulse 24 (FIG. 2). A second capacitor 30 is provided, forming an energy supply storage capacitor for the auxiliary pulse. Capacitor 28 has a capacity of about 250 $\mu$F, and is charged by a charge source, not shown, and connected to a charge supply terminal $V_0$ at a voltage of about 4 kV. The energy of the main discharge will, then, be about 2 kJ. The main discharge is triggered by a firing pulse generated by a trigger pulse source 32, and transferred over a pulse transformer 34 coupled to the capacitor 28 and in circuit with the main discharge circuit and the flash tube 12, as shown in FIG. 1.

The auxiliary capacitor 30 provides the auxiliary pulse. It has, in the example shown, a capacity of 1 $\mu$F and is charged by a suitable voltage source, not shown, and connected to terminal $V_1$ to a voltage of about 16.2 kV. Capacitor 30 is connected to a controlled spark discharge switching gap 36 and to the Xenon flash tube 12, as shown in FIG. 1. The switching gap, or spark gap 36 is triggered by an ignition gap 38, to which a firing pulse is applied from the ignition source 32 over a delay unit 40. Delay unit 40 preferably provides an adjustable time delay. The energy of the auxiliary pulse, in the example shown, is approximately 130 Joules.

The ignition pulse is triggered by a switch 42 — shown schematically only, at a desired instant of time $T_0$. This instant of time $T_0$ occurs, delayed by the time delay $T_1$ introduced by delay unit 40, in advance of the period of time in which the first radiation pulse of the laser should occur.

OPERATION

Main capacitor 28 and auxiliary capacitor 30 are charged to their operating voltages. Thereafter, main switch 42 is closed, thus triggering the main pulse. After the delay time $T_1$ introduced by the delay unit 40, the spark gap 38 is triggered and capacitor 30 will discharge, thus superimposing an auxiliary pulse 26 on the main pulse. Auxiliary pulse 26 is short in comparison to the main pulse 24. The delay time $T_1$ is so selected that the energy applied to the ruby rod 10, upon occurrence of the auxiliary pulse 26, is just below, e.g. about 2%, the threshold energy required for the ruby rod 10, that is, for the laser to initiate radiation.

The "threshold energy", as used herein, is the energy range in which lasing action occurs with a certain probability. Below this range, lasing never occurs; above it, the laser will always radiate. The width of this range of energy is approximately 2.5% of the total pump energy for a typical laser; it is likely to be influenced by cavity adjustments, temperature and other factors.

Time jitter, that is, uncertainty of initiation of laser action by the laser is reduced by at least one order of magnitude with respect to the laser which is triggered by only a single pumping pulse of higher overall energy than the main pulse 24 in the present invention, however. For comparison, upon pumping the laser with a single pulse (charging the capacitor, for example, to 4.3 kV) resulted in an average delay of initiation of laser action of 1090.44 microseconds after initiation of the flash and initiation of laser action, with standard deviation, or time jitter of ± 11.90 microseconds. In contrast, and when starting the laser in accordance with the present invention with a main pulse of comparatively long time duration (about 1 millisecond), of total smaller energy, and of lesser peak intensity, and superimposing a weaker, but short auxiliary pulse (energy about 5% of the main pulse, duration about 10 $\mu$s), standard deviation of only ± 0.53 $\mu$s was measured, with an average delay of initiation of laser action 6.15 $\mu$s after triggering of the auxiliary pulse.

In the example shown, the delay time $T_1$ between triggering of the main pulse and triggering of the auxiliary pulse was 11.40 $\mu$s. The rise time of the auxiliary pulse, in the example shown, was about 2 $\mu$s. Shortening the rise time of the auxiliary pulse further decreases any time variations of initiation of laser action, and thus additionally decreases the time jitter of the laser itself.

The present invention has been described with passive phase-coupled lasers of a particular type; it is, of course, applicable to lasers of other types as well.

Various changes and modifications may be made within the scope of the inventive concept.

Details of an experimental arrangement to measure time jitter, to measure data for comparison tests, and further references to the technology to which the field relates, are published by Alexander Muller and Gerald R. Willenbring Max-Planck-Institut fur biophysikalische Chemie, Abteilung (Department) Laserphysik, Gottingen, Germany, 1974. Alexander Muller and G. R. Willenbring: Reduction of Time Jitter in a Passively Q-switched and Mode-Locked Ruby Laser by a Double-Pulse Technique. Applied Physics 4, 47 – 50 (1974).

We claim:
1. In the art of controlling operation of a laser, a method to decrease time jitter of laser action after occurrence of an event at a reference time ($T_0$), and in which the laser is stimulated to emission after having received pumping pulse light energy, comprising the steps of
 applying a main pulse (24) to the laser, of lesser energy than necessary to stimulate the laser to emission; and superimposing on said main pulse, during the persistence thereof, an auxiliary pulse (26) to apply to the laser the composite of the auxiliary pulse superimposed on the main pulse, the auxiliary pulse being of sufficient energy to raise the laser above threshhold, the auxiliary pulse having a duration and energy which are small with respect to the duration and energy of the main pulse.

2. Method according to claim 1, wherein the rise time of the auxiliary pulse is short with respect to that of the main pulse and is less than that of the main pulse by at least one order of magnitude.

3. Method according to claim 1, wherein the energy content of the auxiliary pulse is less than about 20% of the energy content of the main pulse.

4. Method according to claim 3, wherein the energy content of the auxiliary pulse is less than about 10% of that of the main pulse.

5. Method according to claim 3, wherein the energy content of the auxiliary pulse is in the order of about 5% of that of the main pulse.

6. Method according to claim 1, wherein the duration of the auxiliary pulse is less than the duration of the main pulse by at least one order of magnitude.

7. Method according to claim 1, wherein the pulse energy of the main pulse is slightly less than that needed to stimulate laser to emission.

8. Method according to claim 7 wherein the pulse energy of the main pulse is in the order of 2% less than that needed to stimulate laser to emission.

9. Method according to claim 1, wherein the duration of the auxiliary pulse is less than the duration of the main pulse by two orders of magnitude.

10. Apparatus for controlling operation of a laser, having a source of pump energy (22) comprising a main light energy supply means (28, 34) coupled to the laser (10) to generate a main pump pulse (24) of an energy level just under that required to stimulate laser emission in the laser, auxiliary energy supply means (30,36) to generate an auxiliary pulse (26) and connected to said main energy supply means to superimpose said auxiliary pulse on the main pulse, said auxiliary energy supply means providing energy at a level which is small, and of a duration which is short with respect to the energy supplied by said main energy supply means;

and timing means (40) connected to said main energy supply means and timing triggering of the auxiliary energy supply means during occurrence of the main pulse and at a time when the main pulse has an energy to at least almost stimulate the laser into emission.

11. Apparatus according to claim 10, wherein the main energy supply means comprises a main charge capacitor (28) and means ($V_0$) charging said main capacitor, said main capacitor and said charging means providing energy which is within the range of operation of the energy supply means, and generating within the laser a charge population inversion sufficient to permit stimulation of the laser to laser action and emission;

wherein the auxiliary energy supply means comprises an auxiliary charge capacitor (30) and means ($V_1$) to charge said capacitor;

and switching means (36) are provided, connected to and controlled by said timing means (40) to connect said auxiliary capacitor, for discharge during the discharge of said main capacitor, and apply its energy to pump the laser, to thereby superimpose the pulse energy from said auxiliary capacitor to that of the main capacitor, at the time controlled by said timing means (40).

12. Apparatus according to claim 10, wherein the timing means (40) comprises a delay circuit coupled to the means to generate said main pump pulse, and initiating connection of said auxiliary energy supply means, and hence of said auxiliary pulse, at a predetermined time after initiation of the main pulse.

13. Apparatus according to claim 10, comprising a flash tube (12) connected to and having the energy of both said pulses applied thereto, the energy being supplied by said main energy supply means being below the maximum loading range of said flash tube, the energy being supplied by said auxiliary energy supply means to said flash tube, and superimposed on the energy supplied by said main energy supply means being in the order of about up to 10% of the energy supplied by said main energy supply means.

* * * * *